(12) United States Patent
Heutschi et al.

(10) Patent No.: US 8,422,990 B2
(45) Date of Patent: *Apr. 16, 2013

(54) SWITCHING SYSTEM AND CORRESPONDING METHOD FOR UNICAST OR MULTICAST END-TO-END DATA AND/OR MULTIMEDIA STREAM TRANSMISSIONS BETWEEN NETWORK NODES

(75) Inventors: Walter Heutschi, Jegenstorf (CH); Peter Zbaeren, Kaufdorf (CH); Toni Stadelmann, Bolligen (CH)

(73) Assignee: Togewa Holding AG, Bern (CH)

( * ) Notice: Subject to any disclaimer, the term of this patent is extended or adjusted under 35 U.S.C. 154(b) by 0 days.

This patent is subject to a terminal disclaimer.

(21) Appl. No.: 13/479,020

(22) Filed: May 23, 2012

(65) Prior Publication Data

US 2012/0282894 A1 Nov. 8, 2012

Related U.S. Application Data

(62) Division of application No. 12/280,655, filed as application No. PCT/EP2006/060221 on Feb. 23, 2006, now Pat. No. 8,213,900.

(51) Int. Cl.
*H04M 11/00* (2006.01)
(52) U.S. Cl.
USPC ........ 455/406; 455/410; 455/411; 455/435.1; 370/310.2; 370/338; 370/395.52
(58) Field of Classification Search .......... 455/406–408, 455/410, 411, 435.18; 370/310.2, 338, 395.52
See application file for complete search history.

(56) References Cited

U.S. PATENT DOCUMENTS

| 7,706,791 | B2 | 4/2010 | Heutschi |
| 7,797,243 | B2 | 9/2010 | Stadelmann et al. |
| 2003/0157926 | A1 | 8/2003 | Ala-Laurilla et al. |
| 2005/0177733 | A1 | 8/2005 | Stadelmann et al. |
| 2006/0004643 | A1 | 1/2006 | Stadelmann et al. |
| 2007/0268889 | A1 | 11/2007 | Heutschi et al. |

FOREIGN PATENT DOCUMENTS

| WO | 01 76297 | 10/2001 |
| WO | 2004 017565 | 2/2004 |
| WO | 2005 117342 | 12/2005 |

*Primary Examiner* — Temica M Beamer
(74) *Attorney, Agent, or Firm* — Oblon, Spivak, McClelland, Maier & Neustadt, L.L.P.

(57) ABSTRACT

A method for setting up a data link including requesting an identity of an IP network node by a registration module, transmitting an International Mobile Subscriber Identity (IMSI) stored on a Subscriber Identity Module (SIM) card of the IP network node to the registration module, storing the received IMSI in a user database of the registration module, complementing an IP data channel to form signal and data channels of a GSM network by a signaling gateway module, using the complemented IP data channel as a basis for generating the necessary SS7/MAP functions for authenticating the IP network node, authenticating the IP network node by using the IMSI of the SIM card of the IP network node, receiving an entry in the user database of the registration module upon successful authentication, and setting up a data link to at least some of the network nodes.

13 Claims, 2 Drawing Sheets

SWITCHING SYSTEM AND CORRESPONDING METHOD FOR UNICAST OR MULTICAST END-TO-END DATA AND/OR MULTIMEDIA STREAM TRANSMISSIONS BETWEEN NETWORK NODES

CROSS REFERENCE TO RELATED APPLICATIONS

This application is a divisional application of U.S. patent application Ser. No. 12/280,655, filed on Nov. 11, 2008, which claims priority to PCT application PCT/EP2006/060221, filed on Feb. 23, 2006. The entire contents of each of the above applications are herein incorporated by reference.

BACKGROUND OF THE INVENTION

The present invention relates to a method and a system for unidirectional or bidirectional unicast or multicast end-to-end data and/or multimedia stream transmissions in heterogeneous networks, wherein a network node uses a request to request a data link to one or more network nodes from a central switching unit in an IP network via an interface, wherein at least one network node is an IP network node, which network nodes are registered with a registration module of the central switching unit, and a control module of the central connecting unit is used to set up the connection between the network nodes. The invention relates particularly to a method and a system for IP-based telephony and video telephony in which IP nodes are authenticated on the basis of authentication data from an identification module prior to registration in the IP-based network.

Unidirectional or bidirectional end-to-end data and/or multimedia stream transmissions in IP networks, particularly IP-based telephony, is a technology which has developed in recent years to form a real alternative to conventional data and voice transmission, e.g. via circuit-switched telephone networks. Whereas conventional telephone calls are transmitted as a continuous data stream via a telephone network, IP-based telephony involves voice data being broken down into packets and transmitted individually via a data network. When large volumes of audio information have been broken down and transmitted via the network, these small packets are recompiled at the reception end. This allows telephone services to be combined with the data network, which dispenses with the installation and maintenance of a separate telephone network, since IP-based telephones are connected to a data network via an appropriate interface and voice data can be transmitted using suitable network protocols. A further important advantage of IP-based telecommunication over conventional telephony is the provision of new services which are possible only by virtue of the IP-based technology, and which represent an added value over conventional telephony. Among other things, IP-based telephony provides automatic encryption of the voice communication, which allows tap-proof calls. This development of IP-based telephony has also had an influence on the parallel development of IP-based video telephony as an alternative to conventional video conference technology. Today, ever faster data links allow simultaneous transmission of pictures and sound in outstanding quality. In the case of IP-based video telephony, as in the case of IP-based telephony, voice and picture data are broken down into packets, are sent via an IP-based network and are recompiled at the receiver.

At the same time, the rapid development of wireless data networks (WLAN 802.11, Bluetooth etc.) and an increasing number of what are known as hot spots in the public demand (for example at airports, railway stations, conference centers, trade-fair and exhibition grounds, much-frequented squares in towns) have resulted in IP-compatible appliances today being able to have a level of mobility which is comparable only with today's mobile radio networks (GSM, UMTS etc.). Wireless access to services such as the Internet is today already a matter of course. In addition, IP-based mobile telephones have also been supplied for some time which allow mobile IP-based telephony via a local area wireless network. These mobile IP telephones already also exist in versions with integrated cameras, meaning that again mobile IP-based video telephony is becoming within reach.

For communication setup and data interchange in telephone and/or video telephone networks, all the network components need to observe certain standards which are stipulated in protocols or protocol families. For example, the protocol E-DSS1 (Euro-ISDN) for circuit-switched telephone networks or the protocols H.323, SIP, MEGACO or MGCP for IP-based telephony and/or video telephony are known in the prior art.

One of the most frequently used protocols for IP-based telephony and/or video telephony is the session initiation protocol (SIP, IETF RFC 3261, previous RFC 2543). This was specified by the Internet Engineering Task Force (IETF) for the first time in 1999. This network protocol has a very simple structure and closely resembles the HTTP (Hypertext Transfer Protocol). It allows a communication session to be set up between two or more subscribers. However, it is a pure initiation protocol. For the data interchange, SIP-based telephone and/or video telephone systems use other protocols, particularly SDP (Session Description Protocol, IETF RFC 2327) and the RTP (Realtime Transport Protocol, IETF RFC 1889). SDP is used particularly to negotiate the audio and/or video codecs, transport protocols etc. which are to be used between the end points. The task of RTP is to transport the multimedia data stream (audio, video, text etc.), i.e. to encode the data, to break them down into packets and to send them. Communication end points in an SIP-based system are called user agents. A user agent client (UAC) is understood to mean a component which initiates an SIP request, and the user agent server (UAS) answers this request with a response. A user agent (UA) may take on the role either of the UAC or of the UAS. Requests, of which there are a limited number, are answered, in principle, by responses (around one hundred different ones). They merely bear numbers to distinguish them. A user agent sends an SIP message to an SIP proxy in advance. On the basis of the indicated address, the proxy decides where the message needs to be sent and forwards it. These proxies may, in principle, be stateless or stateful. Whereas stateless proxies merely forward messages and do not actually realize that a call is being set up, for example, stateful proxies can perform tasks which are useful for setting up a call. One of the most important tasks of a stateful proxy is the distribution of calls to various destinations: in a case of what is known as "Sequential Forking", the possible call destinations are dialled in succession, and in the case of "Parallel Forking", all destinations receive a message simultaneously. Another indispensable component of an SIP-based system is an SIP registrar, with which all user agents need to register. This logic unit manages a database containing information about the registered user agents and redirects requests to these destinations. Normally, the registrar and the proxy are the same module, which regulates the redirection internally without the need for messages to be interchanged.

Finally, an SIP-based system also comprises a redirect server or gateway, which ensures the connection between the IP-based telephone network and the PSTN, inter alia.

For the registration, SIP uses the register method. The UA indicates where it needs to be reached and receives confirmation with the code 200 (OK). If the user is not known, 404 (Not Found) is returned; if registration does not allow, the response is 403 (Forbidden). The prerequisite for successful registration is successful authentication of the user agent in the relevant network and a check on its authorization for required services, however. To this end, authentication and authorization methods RADIUS and/or Diameter are usually used in a SIP-based environment, these also being used for many other network functions.

The authentication protocol RADIUS (Remote Authentication Dial In User Service—IETF RFC 2138, 2868) is today used in many network units, such as routers, modem servers, switches etc. The authentication client sends its user name and its password to the RADIUS Server. The RADIUS server checks this information and authorizes the user for the system. The reason for the spread of RADIUS is, inter alia, the network units generally cannot handle a very large number of network users each having different authentication information, since this would exceed the storage capacity of the individual network units, for example. RADIUS allows a large number of network users to be managed centrally (addition, deletion of users etc.). In the case of ISPs (Internet Service Providers), for example, this is thus a necessary prerequisite for the service, since their number of users frequently comprises several thousand to several tens of thousands of users. In addition, RADIUS provides particular permanent protection against hackers. The remote authentication of RADIUS based on TACACS+ (Terminal Access Controller Access Control System+) and LDAP (Lightweight Directory Access Protocol) is relatively secure against hackers. By contrast, many other remote authentication protocols have only intermittent, unsatisfactory or totally nonexistent protection against hacker attacks. Another advantage of RADIUS is the fact that RADIUS was for a long time the de facto standard for remote authentication, which means that RADIUS is also supported by almost all systems.

As the complexity of the requested service is increased, however, RADIUS was found to be unsuitable for use in larger networks. This made it necessary to develop a new protocol. However, the Diameter protocol (IETF RFC 3588) was not redeveloped from scratch, but rather a large proportion of the RADIUS protocol was maintained and errors therein were corrected. Like RADIUS, Diameter uses attribute/value pairs (AVP) for conveying data and UDP as the transport protocol. In addition, it can be extended by adding new commands and AVPs. It is a basic protocol which meets the minimum requirements of an authentication transport protocol. It is therefore not intended to be used on its own, but rather should always be used with an application-specific extension. Diameter is a peer-to-peer protocol. The Diameter client normally initiates an authentication or authorization request from a user. The Diameter server receives this request and either responds to it or forwards it to a proxy server. The mobile node requests the required service using the authentication request message (AMR), which contains the AVPs. The information required for authentication is extracted from this message and included in Diameter AVPs. This message is forwarded to the local Diameter server, which is called AAAF. The AAAF forwards the message to the authentication home server (AAAH). If the AAAH is able to authenticate the user successfully, it sends a home agent MIP request (HAR) to a home agent. Having received the HAR, this home agent first of all processes the Diameter message and then produces the response HAA with the required data, such as session ID etc. and sends it to the AAAH. The latter produces the authentication response (AMA), which contains information for the tunneling of messages, inter alia, and sends it to the AAAF. With that, the connection is set up. The mobile IP extension furthermore defines numerous special cases, such as the handling of handoffs.

In addition to the authentication and authorization, a network for IP-based telephony and/or video telephony requires suitable billing mechanisms. TAP (Transferred Account Procedure) protocol from the GSM association's Transferred Account Data Interchange Group (TADIG) is the protocol which is known in the prior art for billing for the service demanded by mobile units in GSM networks. A very important concept in GSM networks is roaming, a method which allows a user of mobile radio to use his mobile radio not only in his original network but also in any desired network at home or abroad. However, this method requires a billing concept which can accommodate the complexity of the protocols and the various provided services without error. The billing methods for GSM networks must therefore in no way be trivial. Today, more than 400 GSM networks are in operation worldwide and it is also estimated that there are more than 20,000 individual roaming agreements in existence between the individual network operators. To allow billing, the seemingly simple idea of roaming therefore conceals an extremely complex process of information recording, information distribution and information evaluation. In this connection, the transferred account procedure (TAP) protocol is used for the interchange of roaming billing information between the individual mobile radio network service providers. On Jun. 4, 2000, TAP2 and TAP2+ were finally followed by the launch of TAP3. There are already subversions TAP3.1 and TAP3.2. TAP3 can today be denoted as the standard, although TAP is a developing protocol.

Most voice or data traffic in GSM networks enters or ends in a different network from the one the mobile user is currently in. The operator of a local network levies charges for every call which ends at one of its users, regardless of whether a landline network or a mobile radio network is involved. To simplify the charge levying, the local fixed network operators enter mutual agreements with the local mobile radio network operators. Thus, a mobile radio network operator in one country does not need to conclude an agreement with the landline network provider in another country in order to bill for a call from the mobile radio network of the first provider to the landline network of the second provider. Normally, the landline network provider in the first country has already concluded an agreement relating to billing type and charges with the landline network provider in the second country, so that the mobile radio network operator in the first country can then bill for his services via the landline network provider with an appropriate agreement. The costs are usually billed to the user either directly (retail billing) or via a service provider (wholesale billing). The type of billing for roaming-data or voice traffic between different mobile radio networks (PMN: Public Mobile Network) is effected using the TAP protocol. Roaming call records are typically produced either as TAP or as CIBER (Cellular Intercarrier Billing Exchange Roamer) records. CIBER records are used by mobile radio network operators using AMPS-based technologies, such as AMPS, IS-136 TDMA and IS-95 CDMA. TAP is used primarily by GSM/UMTS mobile radio network service providers and is the primary protocol for billing in GSM/UMTS-dominated areas.

Details of a call by a user who is in an alien network (VPMN: Visited Public Mobile Network) are registered in a mobile switching center (MSC) in the network. Every call thus produces one or more call records. The GSM standard for these records is defined in GSM 12.05, although many providers use their own formats. The call records of the MSC are transmitted to a billing system in the VPMN for billing. These call records are then converted to TAP format and are associated with the relevant user. No later than within a predefined time (e.g. 36 hours), the TAP records are sent to the relevant mobile radio network service providers. The TAP files additionally contain information relating to the provider service tariff (IOT: Inter Operator Tariff) and all other bilateral agreements and benefit schemes. The TAP records are sent directly or more usually via a billing center, such as a clearing house. When the home network operator (HPMN: Home Public Mobile Network) receives a TAP record from the VPMN, it is converted to an appropriate internal format and billed together with the normal call records of the user which it produces in the home network. In the case of wholesale billing, in which a service provider bills the costs incurred to the user, the HPMN forwards the records to the service provider, which can bill for the calls again, particularly also on the basis of its own tariffs, and produces the bill with, by way of example, call details for the user.

TAP3 supports a multiplicity of services. Today, TAP3 is used for the billing between GSM/UMTS service providers and GSM/UMTS service providers, GSM/UMTS service providers and non-GSM service providers (interstandard roaming) and GSM service providers and satellite service providers etc. The three fundamental categories of service, voice, fax and what are known as supplementary services, have already been supported since TAP1. By contrast, billing for the short message service (SMS) is less of a trivial matter on account of the use of short message service centers (SMS-C) belonging to third parties. Billing for SMS is more difficult for the following reasons: 1. A roaming user can receive an SMS while roaming (MT-SMS), 2. A roaming user can send an SMS while roaming (MO-SMS) by using his home network's SMS-C, and 3. A roaming user can send an SMS while roaming (MO-SMS) by using an alien network's SMS-C. Billing for SMS services is therefore not fully supported until TAP2+. From TAP3 onward, billing for circuit switched data, HSCSD (High Speed Circuit Switched Data) and GPRS (General Packet Radio Service) is also supported. TAP3 equally supports all value added services (VAS), such as what is known as billing for content. However, billing for value added services is frequently difficult, since it presupposes that the service provider is in agreement with the billed services. Customized application mobile enhanced logic (CAMEL) has been supported since the introduction of TAP3.4. CAMEL is particularly important for applications in prepaid services for roaming users and ought to become very important in the future. Another important application of TAP3 is support for billing based on inter operator tariff (IOT). IOT allows the home network service provider (HPMN) to check specific offers and tariffs from an alien service provider (VPMN) and to pass them on to the roaming user. Thus, by way of example, the VPMN may provide benefits or discounts for different call services or levels and the HPMN can easily verify these and adjust its tariffs. The opportunity to bill for roaming services independently of where the user is currently located is a valuable tool for mobile network service providers and prevents loss of income when a VPMN temporarily provides benefits. The TAP protocol likewise comprises detailed information, from TAP onward, regarding from where precisely a call was made, or a service was used etc., and where it was made to. This information assists in establishing a profile of the respective user on the basis of his behavior, which provides important information to adjust and optimize the services provided on the basis of the needs of the users. In particular, it can be used to provide specific location based services, such as sports or concert events etc. Finally, the returned accounts procedure (RAP) protocol means that TAP3 also allows differentiated error handling. Thus, RAP allows the HPMN to check incoming TAP files, inter alia, for validity and compliance with the TAP standard and if necessary to reject them in part without thereby losing billing for services which have been transmitted correctly.

At the interface between IP-based telephony and/or video telephony and conventional telephone networks, it is necessary, in principle, to solve similar problems to those in the case of billing for calls between two different mobile radio network operators. First, there is typically a large number of operators, and in practice it can be assumed that every one of these operators uses its own tariff model. Secondly, a customer of one operator can call arbitrary customers of another operator, which will be reflected in higher call charges. General guidelines for making compensatory payments can be found in ITU recommendation D.196, for example. For standard procedure for clearing and settlement, however, there are no publicly accessible standards and protocols. In addition, there are several providers for a clearing house which, in particular, are able to be used by mobile radio operators for billing roaming charges. However, a common feature of all of these providers is that likewise no publicly accessible standards are used.

So that it is possible to charge for a call between two providers via a central point, all providers need to use a standard protocol. For these purposes, the company TransNexus has specified the open settlement protocol (OSP), which ETSI has declared to be the standard in its TIPHON specification. OSP firstly defines a basic framework for standardized interchange of information. Secondly, the specification also consciously provides for portions of the protocol to be able to be replaced or extended. It is therefore likewise possible to incorporate special requirements and operator-specific services.

The transmission protocol used in the OSP is a combination of HTTP and S/MIME. For transmission, the POST method from HTTP is used. Although the PUT method also exists in order to transmit data to a server using HTTP, only the POST method can be used to assign the data which are also transmitted to a particular server resource which processes the data further. In addition, the content of the transmitted data comprises an S/MIME message. To align OSP messages with a clearing house, there are two modes of operation: the online mode and the bulk mode. In the online mode, there is a connection to the clearing house while a call is taking place between the various network operators. The reason for this approach is that the clearing house can perform a few tasks for setting up the call. Should, by way of example, the backend service associated with the caller have two little information about the destination of the call, the clearing house can make routing decisions and can supply a contact address for the destination gatekeeper. In addition, it is conceivable to incorporate the functionality of a service area broker (SAB) into the clearing house. The task of an SAB is to ascertain the best way to set up the call, which may involve taking into account tariffs based on the time of day and current load levels on the networks. However, the drawback of the online mode is an increase in the delay time for connection setup, because ultimately the caller's gatekeeper needs to await not only various responses from its own backing service but consequently also responses from the clearing house. In the bulk mode, on the other hand, a connection is set up to the clearing house only at prescribed times. An advantage of this method is that a process which is independent of the gatekeeper can read the CDRs from the backend service and can transmit them to the clearing house without interruption. Another advantage in contrast to the online mode is that a temporary absence of the clearing house does not result in any significant disruptions to one's own system. This is because should a transfer of CDRs be terminated or not happen, it can easily be repeated at a later time. However, a significant drawback that can be seen is that a clearing house cannot act as an SAB in the bulk mode. In addition, no routing decisions can be made by the clearing house, because this can likewise only be done in the online mode. The most important components of an OSP message are the pricing exchange, authorization exchange and usage exchange. Pricing exchange comprises the interchange of information for the costs of a telephone call. This pricing exchange comprises the transmission of a pricing indication, which needs to be confirmed with a pricing confirmation. The authorization exchange is performed when resources need to be used by the clearing house. Normally, this corresponds to authorization for the setup of a telephone call. Like the pricing exchange, the authorization exchange is also based on the transmission of an authorization request, which is confirmed with an authorization response. The usage exchange contains a description of the resources used. To this end, a usage indication is sent which is confirmed with a usage confirmation. Since the OSP still cannot distinguish any services, the term usage should be understood to mean the call time for a conducted telephone call.

IP-based telephony and video telephony in the prior art are associated with considerable drawbacks, however. Although it is possible today to authenticate the call participants in an IP-based network using authentication and authorization mechanisms as described, and to check their authorization for particular services, these authentication and authorization methods are fairly complicated and also do not meet the high standards regarding security, billing and service authorization, as are provided in the conventional telephone networks. In particular, GSM/UMTS mobile radio networks provide standards for authentication and authorization which are not able to be implemented in an IP-based network on account of its intrinsic characteristics. This is because the open architecture of the IP protocol lacks a large amount of information which is absolutely necessary for full compatibility with the GSM networks.

BRIEF SUMMARY OF THE INVENTION

It is therefore an object of the invention to propose a novel and better method and a system for unidirectional or bidirectional end-to-end data and/or multimedia stream transmissions in heterogeneous networks. In particular, this novel and better method and system are intended to allow the users of IP-based telephony and/or video telephony to be provided with the same standards for registration or authentication and authorization as those to which they are accustomed from conventional telephony, such as from GSM mobile radio telephony.

In line with the present invention, these aims are achieved particularly by the elements of the characterizing part of the independent claims. Further advantageous embodiments are also revealed by the dependent claims and the description.

In particular, the invention achieves these aims in that, for unidirectional or bidirectional unicast or multicast end-to-end data and/or multimedia stream transmissions in heterogeneous networks, a network node uses a request to request a data link to one or more network nodes from a central switching unit in an IP network via an interface, wherein at least one network node is an IP network node and at least some of the network nodes are registered with a registration module of the central switching unit, and wherein a control module of the central connecting unit is used to set up the connection between the network nodes, in that for the purpose of data and/or multimedia stream transmission the at least one IP network node an IMSI, stored on a SIM card of the IP network node, is transmitted to the registration module at the request of the registration module and the IMSI is stored in a user database of the registration module, in that a signaling gateway module is used to complement the IP data channel to form signal and data channels of a GSM network, and the at least one IP network node is authenticated by taking the accordingly complemented GSM data as a basis for generating the necessary SS7/MAP functions, in that the registration module uses the user database and the signaling gateway module to authenticate the IP network node on the basis of the IMSI of the SIM card of the at least one IP network node in an HLR and/or VLR and/or AuC and/or functionally equivalent database, and in that upon successful authentication the at least one IP network node receives an appropriate entry in the user database of the registration module, wherein the data link to the one or more other network nodes is set up by means of a control module of the central connecting unit. The invention has, inter alia, the advantage that secure and convenient authentication and/or authorization of the users for unidirectional or bidirectional unicast or multicast end-to-end data and/or multimedia stream transmissions in heterogeneous networks, particularly IP networks, is possible using a central switching unit, as is known from GSM mobile radio telephony. In this application, "unicast" is intended to be understood quite generally to mean an end-to-end bidirectional and/or unidirectional data link between two individual network nodes, while "multicast" is similarly understood quite generally to mean an end-to-end bidirectional and/or unidirectional data link between one and a plurality of network nodes.

In one variant embodiment, the data and/or multimedia stream transmissions may comprise, by way of example, particularly IP-based telephony and/or video telephony. The IP-based telephony and/or video telephony may be based at least in part on the session initiation protocol (SIP), wherein the control module in the central connecting unit comprises an SIP proxy network element and wherein the registration module comprises an SIP registrar network element. The at least one IP network node may be an IP-compatible mobile radio telephone or may comprise an appropriate module. This has the advantage, inter alia, that secure and convenient authentication and/or authorization of the users become possible in an IP-based telephone and/or video telephone network. By combining IP-based telephony and/or video telephony with a convenient and secure method, highly safeguarded and tried-and-tested authentication and/or authorization of the users becomes possible, as is known from GSM mobile radio telephony. The use of the SIP protocol has the advantage, inter alia, that the SIP protocol is a much used alternative in the IP-based telephone and/or video telephone networks. SIP is easy to implement, modeled on the HTTP protocol and allows a high level of flexibility for a wide variety of applications. Equally, there are already many products on the market today which support SIP protocols.

In another variant embodiment, upon successful authentication of the IP network node a location update is performed in the HLR and/or VRL and/or AuC and/or a functionally equivalent database and appropriate data are transmitted to the registration module. This has the advantage that it is additionally possible for a simple kind of session control to be performed centrally. The resultant session control can be performed in addition to session control in the central connecting unit.

In another variant embodiment, the authentication by means of the IMSI is taken as a basis for granting the appropriate service authorization to use the connecting unit (10) and/or for billing for the demanded service using a billing module. This variant embodiment has the advantage, inter alia, that simple billing for the demanded service can be performed. By way of example, the billing can therefore also be allocated directly by means of billing systems of service providers in GSM networks without the need to alter the existing infrastructures in any way. By way of example, billing can also be effected by transmitting call detail records produced by means of the control module and/or the IP network node to the registration module, with the registration module detecting at least the identity of the IP network node and/or the period and/or the provider of the demanded service and forwarding it/them to a billing module, and the billing module producing billing files in line with the demanded service on the basis of the billing data from the registration module and on the basis of the call detail records and transmitting them with invoicing instructions to a clearing module. The authentication by means of the connecting unit can also be performed, by way of example, only if the request for connection and/or connection setup comes from an IP network node. This is the case particularly if the authentication is used only for performing billing, for example. If the request comes from a network node other than an IP network node, such as from a GSM network appliance, then, if available, the billing methods which are typical in this network can also be used. Use of the call detail records has the advantage, inter alia, that the billing for the demanded services can easily be handled by means of a clearing module, particularly in the case of clearing between the various network operators.

In yet another variant embodiment, the one or more IP nodes can be authenticated using the extensible authentication protocol. This has the advantage, inter alia, that, in combination with RADIUS, for example, a complete, hardware-independent method is produced. In particular, EAP provides the necessary security mechanisms for performing the authentication.

In principle, instead of the SIM card of the IP node, it is also possible to use any identification module. However, the SIM card has the advantage, inter alia, that the SIM card is a widely used and tried-and-tested means for identifying IP nodes, particularly mobile IP nodes. It likewise meets the high security standards and, as a result of its small size, can also easily be exchanged or transported. In addition, the costs of manufacturing such SIM cards are low in comparison with other similar identification mechanisms.

In one variant embodiment, authentication data are used which meet the GSM standard. This variant embodiment has the advantage, inter alia, that an existing GSM infrastructure of a provider can be used without relatively great modification. In this case, user profiles are created for the users of the IP-based telephony and/or video telephony, as for the users of conventional mobile radio telephony. In addition, this allows use to be made of existing strong security criteria in GSM technology.

In another variant embodiment, the authentication data are transmitted from the IP network node to the registration module using a contactless interface. This variant embodiment has the advantage, inter alia, that mobile IP nodes can be used, which allows greater mobility of the users of the IP-based telephony and/or mobile telephony, comparable to mobile radio telephony.

In another variant embodiment, the authentication data will be transmitted from the IP node to the registration module using a WLAN 802.11 and/or Bluetooth and/or GSM and/or UMTS interface. This has the advantage that known and established networks can be used for transmitting authentication data, which means that existing facilities (hotspots) can be used.

At this juncture, it should be recorded that the present invention relates not only to the method according to the invention but also to a system for carrying out this method.

BRIEF DESCRIPTION OF THE SEVERAL VIEWS OF THE DRAWING

Variant embodiments of the present invention are described below with reference to examples. The examples of the embodiments are illustrated by the following appended figures.

DETAILED DESCRIPTION OF THE INVENTION

Figure 1:
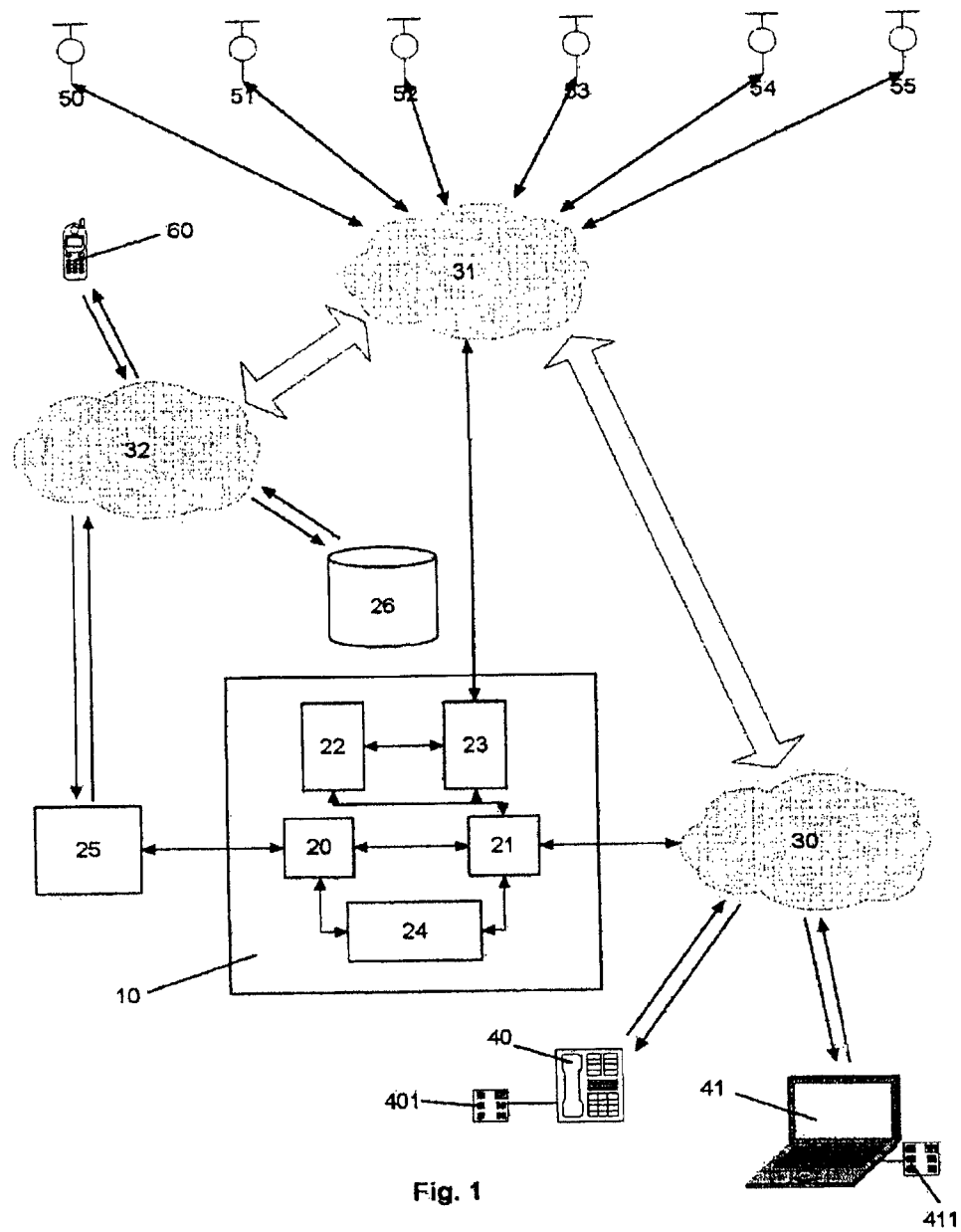
FIG. 1 shows a block diagram which schematically illustrates a method according to the invention and a system according to the invention for unidirectional or bidirectional unicast or multicast end-to-end data and/or multimedia stream transmissions in heterogeneous networks, particularly for IP-based telephony and/or video telephony, wherein the IP nodes 40/41 comprise an identification module 401/411 and use a data network 30 to access a switching unit 10 or appropriate infrastructure for data transmissions or setting up data links. The connecting apparatus 10 comprises a signaling gateway module 20, control module 21, registration module 22 and an IP/PSTN gateway 23, which is used to set up communication with the telephones 50, . . . , 55 connected by means of the public switched telephone network 31/32.
Figure 2:
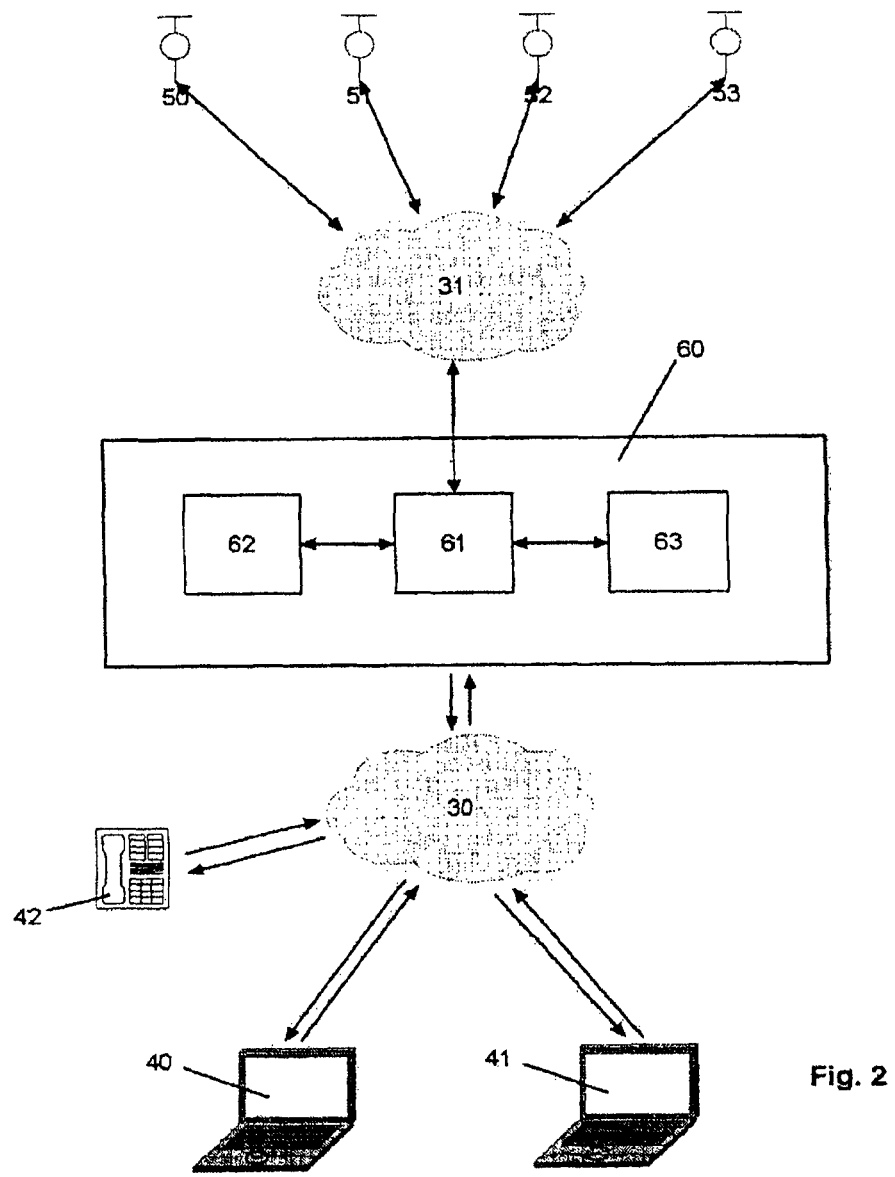
FIG. 2 shows a block diagram which schematically illustrates a method and a system for IP-based telephony and/or video telephony in the prior art. In this case, the IP nodes 40, . . . , 42 use a data network 30 to access a system or an appropriate infrastructure for IP-based telephony and/or video telephony 60. This infrastructure for IP-based telephony and/or video telephony 60 comprises a registration module 61, a control module 62 and a gateway IP/PSTN 63, which is used to set up communication with the telephones 50, . . . , 53 connected by means of the public switched telephone network 31.

FIG. 1 illustrates an architecture which can be used to implement the invention. In FIG. 1, the reference symbol 40/41 relates to an IP network node which has the necessary infrastructure, including all the hardware and software components, to implement a method and/or system according to the invention as described. IP network nodes 40/41 are to be understood to mean, inter alia, all possible "customer premise equipment" (CPE) provided for use at various network locations and/or with various networks. This equipment comprises, by way of example, IP-based telephones and/or videophones, and also any other IP-compatible appliances, such as PDAs, laptops or mobile radio telephones. The IP nodes 40/41 have one or more different physical network interfaces, which can also support several different network standards. By way of example, these physical network interfaces of the IP node 40/41 may comprise contactless interfaces for WLAN (Wireless Local Area Network), Bluetooth, GSM (Global System for Mobile Communication), GPRS (Generalized Packet Radio Service), USSD (Unstructured Supplementary Services Data), EDGE (Enhanced Data Rates for GSM Evolution) or UMTS (Universal Mobile Telecommunications System) etc. However, these may also be physical network interfaces for Ethernet, Token Ring or another Wired LAN (Local Area Network). The reference symbols 30/31/32 are accordingly the various networks, for example a Wireless LAN (based on IEEE 802.1x), a Bluetooth network, a Wired LAN (Ethernet or Token Ring), or else a mobile radio network (GSM, UMTS, etc.) or a PSTN network. The physical network interfaces of the IP node 40/41 may be not only packet-switched interfaces, as are used by network protocols directly, but also circuit-switched interfaces, which can be used by means of protocols such as PPP (Point to Point Protocol), SLIP (Serial Line Internet Protocol) or GPRS (Generalized Packet Radio Service) for data transfer.

In addition, the IP node 40/41 comprises an identification module 401/411. This identification module 401/411 may be implemented in hardware or in software and may be connected to the IP node 40/41 by means of a contact-based or contactless interface, or may be integrated in the IP node 40/41. In particular, the identification module 41 may be in the form of a SIM card, as are known from mobile radio telephones. This identification module 401/411 contains, inter alia, the authentication data which are relevant for authenticating the IP node 40/41 in an IP-based network for telephony and/or video telephony. These authentication data may comprise, in particular, an IMSI (International Mobile Subscriber Identifier) and/or TMSI (Temporary Mobile Subscriber Identifier) and/or LAI (Location Area Identity) etc., which are based on the GSM standard.

For registering the IP node 40/41 for unidirectional or bidirectional unicast or multicast end-to-end data and/or multimedia stream transmissions, particularly IP-based telephony and/or video telephony in heterogeneous networks 30/31/32, a network node uses a request to request a data link to one or more network nodes from a central connecting unit 10 in an IP network 30 via a contact-based or contactless interface. In principle, point-to-point connection (unicast) is intended to be understood to mean all direct connections between two network subscribers from point-to-point. This covers both point-to-point and end-to-end connections. In this context, point-to-point connections work without an actual switching intermediate station. They cover communication in the lower network layers (1-3 in the OSI model). End-to-end connections also cover all connections on the higher network layers ((4-7 in the OSI model). In the case of end-to-end communication, an intermediate station is always used for call transfer. Reference is also made in this context to multihop communication. Multicast denotes data transmission in groups (also called multipoint connection). For multicast, data are transmitted to a plurality of subscribers simultaneously or to a closed subscriber group, usually without the bandwidth being multiplied by the number of receivers at the transmitter. For multicasting, the transmitter requires only the same bandwidth as a single receiver. If packet-oriented data transmission is taking place, the packets are duplicated on every distributor (switch, router) on the route. IP multicast allows data to be sent efficiently in TCP/IP networks to a large number of receivers at the same time. This can be done using a specific multicast address, for example. In IPv4, the address range 224.0.0.0 to 239.255.255.255 (class D) is reserved for this, and in IPv6 every address starting with FF00. In addition, the protocol IGMP is used for coordination in IPv4. In IPv6, ICMPv6 can perform the control function. In this document, unicast and multicast are explicitly also intended to be understood to mean bidirectional connections, i.e. individual group subscribers can each communicate with and transmit data to all others. The switching system according to the invention comprises said central connecting unit 10 for generating data links between two or more network nodes 40, ... , 42/50, ... , 55/60 on the basis of a request from the network node. The network nodes 40, ... , 42/50, ... , 55/60 comprise at least one IP network node 40/41. The central connecting unit 10 comprises a registration module 22 for registering the network node and comprises a control module 21 for setting up the connection between the network nodes. As mentioned, the at least one IP network node 40/41 comprises a SIM card 401/411 for storing an IMSI and also means for transmitting the IMSI to the registration module 22 on request. The IMSI can be stored in a user database in the registration module 22. To authenticate the one or more IP nodes 40/41, the central connecting unit can use the extensible authentication protocol, for example. The switching system also comprises a signaling gateway module 20 for complementing the logical IP data channel to form signal and data channels in a GSM network. A MAP gateway module 25 is used to generate the necessary SS7/MAP functions for authenticating the at least one IP node 20. It may make sense for the signaling gateway module 20 and the MAP gateway module 25 to be implemented together in a single module. The registration module 22 authenticates the at least one IP network node 40/41 using the user database and the signaling gateway module 20 on the basis of the IMSI of the SIM card 401/411 of the at least one IP network node 40/41 in an HLR and/or VLR and/or AuC 26 and/or a functionally equivalent database. Upon successful authentication of the at least one IP network node 40/41 in the user database of the registration module 22, an appropriate entry is stored and/or the data link to the one or more other network nodes is set up by means of a control module 21 in the central connecting unit 10.

By way of example, the IP node 40/41 uses the interface to the IP-based network 30 to request access to a telephony and/or video telephony service. As already described, the IP-based network 30 may comprise various network standards and protocols, such as wireless networks WLAN 802.11 or Bluetooth or else wired networks Ethernet or Token Ring etc. The central connecting unit 10 comprises an IP/PSTN gateway 23, which assures the connection between the IP-based network 30 and the public switched telephone network (PSTN) 31 and/or mobile radio network 32. It is important to mention that the gateway IP/PSTN 23 can be operated in integrated fashion with respect to the central switching unit 10 and/or in remote fashion with respect to the central switching unit 10 via the IP network 30. The mobile radio networks 32 can also be accessed via the signaling gateway module 20. The infrastructure may be constructed according to the requirements of the SIP (Session Initiation Protocol) and/or H.323 and/or MGCP (Media Gateway Control Protocol) and/or MEGACO (Media Gateway Control) protocol for IP-based telephony and/or video telephony. A registration request contains the authentication data from the identification module 4017411 of the IP node 40/41 and registration data for registration in the IP-based telephone and/or video telephone network. In particular, the authentication data may contain the IMSI of a GSM-based SIM card. This registration request is transmitted to the registration module 22 of the IP-based telephone and/or video telephone network, for example to an SIP register. The authentication data are separated from the registration data by the registration module 22 and are transmitted to an authentication module, such as an AuC (Authentication Center). On the basis of the authentication data, the necessary authentication and/or authorization and/or configuration functions are generated, so that the authentication module performs the authentication and/or authorization for the IP node 40/41 on the basis of the authentication data from the identification module 401/411 of the IP node 40/41 in a home location registry HLR and/or visitor location register (VLR) and/or authentication center and/or functionally equivalent database 26. As mentioned, this database 26 may be or comprise, in particular, a home location registry (HLR) for a GSM network and may contain appropriate user profiles. It is also conceivable to authenticate the IP node 40/41 by merely using the IMSI from the identification module 401/411 of the IP node 40/41 in one or more of the steps in the authentication, while the IMSI is replaced by a generated temporary IMSI (called TMSI) for all the other authentication steps.

For the authentication method, it is possible to use the following challenge-response method, in particular. As the challenge (request) the identification module 401/411 (e.g. the SIM card) is provided with a 128-bit random number (RAND). Next, the identification module 401/411 executes a confidential algorithm which is specific to the respective operator and which, as input, receives the random number RAND and a secret key Ki stored on the identification module 401/411, and this is used to generate a 32-bit response (SRES) and a 64-bit key Kc. Kc is used to encrypt the data transfer via wireless interfaces (GSM technical specification GSM 03.20 (ETS 300 534): "Digital cellular telecommunication system (Phase 2); Security related network functions", European Telecommunications Standards Institute, August 1997). For authentication, a plurality of RAND challenges are used to generate a plurality of 64-bit Kc keys. These Kc keys are combined to form a longer session key. At the start of the a authentication, the IP node 40/41 transmits the international mobile subscriber identity (IMSI) of the user from the identification module 401/411 to the registration module 22. With the IMSI, the registration module 22 receives n GSM triplets on a triplet request from the relevant HLR 26, or the relevant database. The registration module 22 uses the triplets to calculate MAC_RAND and the session key K. By way of example, the calculation of the cryptographic values of the SIM generated session key K and of the message authentication codes MAC_RAND and MAC_SRES can be found in the document "HMAC: Keyed-Hashing for Message Authentification" by H. Krawczyk, M. Bellar and R. Canetti (RFC2104, February 1997). Next, the GSM authentication algorithm runs on the identification module 401/411 of the IP node 40/41 and calculates a copy of MAC_RAND. The IP node 40/41 checks that the calculated value of MAC_RAND is the same as the received value of MAC_RAND. If the two values do not match, the IP node 40/41 terminates the authentication method and does not send any authentication values calculated by the identification module 401/411 to the network. Since the value RAND is received together with the message authentication code MAC_RAND, the IP node 40/41 can ensure that RAND is new and has been generated by the network. If authentication is successful, a location update can be performed in the HLR 26 or in the functionally equivalent database, for example, and the IP node 10 receives an appropriate entry in a customer database of the registration module 22.

Following authentication and/or authorization in the home location registry 26 or the functionally equivalent database, the relevant localization data are transmitted from the authentication module to the registration module 22. The registration module 22 is used to store the localization data in a database with information about the IP nodes 40/41 in the IP-based telephone and/or video telephone network. In particular, these localization data may include IP address, MAC address and other relevant data for the IP-based telephony and/or video telephony. In addition to the authentication in the IP-based telephone and/or video telephone network, it is also possible for call detail records produced via the control module (21) and/or the IP network node (40/41) to be transmitted to the registration module 22, for example. The registration module 22 can then be used to detect at least the identity of the IP node 40/41 and/or the period and/or provider of the demanded service and to forward it/them to a billing module, for example. The billing module can be used to produce billing files in line with the demanded service on the basis of the billing data from the registration module 40/41 and on the basis of the call detail records and to transmit them with invoicing instructions to a clearing module. The registration module 22 then transmits appropriate authentication data to the identification module 401/411 of the IP node 40/41 and stores them, whereupon the IP node 40/41 is enabled for IP-telephony and/or video telephony.

As mentioned, upon successful authentication of the IP network node 40/41, a location update can be performed in the HLR 25 and/or VRL and/or AuC and/or a functionally equivalent database, and appropriate data can be transmitted to the registration module 22. This can be done, but is in no way a feature which is necessary for the invention. The location update is used merely for session control. That is to say that a central station is able to check whether the same identification number, such as the IMSI and/or MSISDN, is used a plurality of times and simultaneously, for example for dishonest purposes, by misusing identification modules 401/411 and/or identification numbers which have been stolen or acquired unjustly in another way.

The control module 21 can also grant the appropriate service authorization to use the connecting unit 10, for example merely on the basis of the authentication by means of the IMSI and/or the control module 21 can initiate appropriate billing for the demanded service using a billing module 24 or an appropriate billing platform. This allows simple billing for the demanded service to be performed. By way of example, the billing can also be allocated directly using billing systems of service providers in GSM networks without the need to alter the existing infrastructures in any way. Billing can also be effected by transmitting call detail records from the IP network node 40/41 to the registration module 22, for example, with the registration module 22 detecting at least the identity of the IP network node 40/41 and/or the period and/or provider of the demanded service and forwarding it/them to the billing module 24. The billing module 24 can produce billing files, for example in line with the demanded service, on the basis of the billing data from the registration module 22 and on the basis of the call detail records and can transmit them with invoicing instructions to a clearing module. The authentication by means of the connecting unit can, by way of example, also be performed only if the request for connection and/or connection setup comes from an IP network node 40/41. This is the case particularly if the authentication is used only for performing billing, for example. If the request comes from a network node 50, . . . , 55/60 other than an IP network node 40/41, such as from a GSM network appliance 60, then it is also possible to use the billing methods which are typical in this network 31/32, if available. The use of the call detail records has the advantage, inter alia, that the billing for the demanded services can easily be handled by means of a clearing module, particularly in the case of clearing between the various network operators.

List of References

10 Central switching unit
20 Signaling gateway module
21 Control module 22 Registration module
23 Gateway IP/PSTN
24 Billing module/billing platform
25 MAP gateway
26 HLR/VLR/AuC
30 IP network
31 PSTN (Public Switched Telephone Network)
32 GSM network
40/41/42 IP network node
401/411 SIM
50, . . . , 55 Network nodes in the PSTN (Telephone)
60 Network nodes in a mobile radio network

The invention claimed is:

1. A method for establishing at least one of IP-based telephony or video telephony based on a session initiation protocol (SIP) in heterogeneous networks, wherein a control module in a central connecting unit is configured to set up a connection between the network nodes, the method comprising:
   requesting a data link to one or more network nodes from the central connecting unit in an IP network, at least one network node being an IP network node and at least some of the network nodes being registered with a registration module in the central connecting unit;
   requesting an identity of the IP network node via a registration module;
   transmitting an International Mobile Subscriber Identity (IMSI) stored on a Subscriber Identity Module (SIM) card of the IP network node to the registration module;
   storing the received IMSI in a user database of the registration module;
   complementing an IP data channel to form signal and data channels of a GSM network via a signaling gateway module;
   generating the necessary SS7/MAP functions for authenticating the IP network node based on the complemented IP data channel having GSM data;
   authenticating the IP network node in that the registration module uses the user database and the signaling gateway module on the basis of the IMSI of the SIM card of the IP network node in at least one of a Home Location Register (HLR), Visited Location Register (VLR), Authentication Center (AuC), or functionally equivalent database;
   receiving an entry in the user database of the registration module upon successful authentication; and
   setting up a data link from the IP network node to the at least some of the network nodes via the control module of the central connecting unit.

2. The method as claimed in claim 1, further comprising:
   performing a location update in at least one of the HLR, VRL, AuC, or functionally equivalent database upon successful authentication of the IP network node; and
   transmitting the location update to the registration module.

3. The method as claimed in claim 1, wherein said granting the service authorization to use the central connecting unit is authorized when a request for connection comes from an IP network node.

4. The method as claimed in claim 1, wherein said authenticating the IP network node further includes
   authenticating, via an extensible authentication protocol, the IP network node.

5. The method as claimed in claim 1, wherein at least one of data or multimedia stream transmission includes at least one of IP-based telephony or video telephony.

6. The method as claimed in claim 1, wherein the IP network node is an IP-compatible mobile radio telephone.

7. The method as claimed in claim 1, further comprising:
   generating call detail records by at least one of the control module or IP network node from the data link;
   transmitting the call detail records from at least one of the control module or IP network node to the registration module;
   detecting at least one of the identity of the IP network node, a duration, or a provider of a demanded service to produce billing data via the registration module;
   forwarding the billing data from the registration module to the billing module;
   producing billing files based on the demanded service, the billing data, and the call detail records via the billing module; and
   transmitting the billing files with invoicing instructions from the billing module to a clearing module.

8. The method as claimed in claim 1,
   wherein the central connecting unit includes an IP/PSTN gateway for connection between the IP-based network and at least one of a public switched telephone network or mobile radio network,
   the method further comprising:
   operating the gateway IP/PSTN in at least of integrated fashion with respect to the central connecting unit or in remote fashion with respect to the central connecting unit via the IP network.

9. A switching system for at least one of IP-based telephony or video telephony based on session initiation protocol (SIP) in heterogeneous networks, the switching system comprising:
   a central connecting unit configured to generate data links between two or more network nodes based on a request from a network node, the two or more network nodes including at least one IP network node, the central connecting unit including a registration module configured to register the two or more network nodes and a control module configured to set up a connection between the network nodes, the at least one IP network node including a Subscriber Identity Module (SIM) card storing an International Mobile Subscriber Identity (IMSI), and a transmitter configured to send the IMSI to the registration module upon a request, the registration module including an user database to store the IMSI; and
   a signaling gateway module configured to complement a logical IP data channel to form signal and data channels of a GSM network and authenticate the at least one IP network node by using a MAP gateway module to generate necessary SS7/MAP functions,
   wherein
      the registration module further includes an authenticating unit to authenticate the at least one IP network node via the user database and the signaling gateway module on the basis of the IMSI of the SIM card of the at least one IP network node in at least one of a Home Location Register (HLR), Visited Location Register (VLR), Authentication Center (AuC), or functionally equivalent database, and
      the registration module is further configured to store an entry in the user database upon successful authentication of the at least one IP network node and to set up a data link from the at least one network node to the two or more network nodes via the control module of the central connecting unit.

10. The switching system as claimed in claim 9, wherein the signaling gateway module is configured to update a location in at least one of the HLR, VLR, AuC, or functionally equivalent database upon successful authentication of the IP network node, and transmit the location update to the registration module.

11. The switching system as claimed in claim 9, wherein the at least one IP network node is authenticated via the extensible authentication protocol.

12. The switching system as claimed in claim 9, wherein the at least one IP network node is an IP-compatible mobile radio telephone.

13. The switching systems as claimed in claim 9, wherein at least one of the at least one IP network node or the control module includes a processing unit configured to detect and generate call detail records, the call detail records being associated with a respective IP network node via the registration module, the registration module is configured to detect at least one of an identity of the IP network node, a duration, or a provider of a demanded service, to produce billing data by the registration module, and to forward the billing data from the registration module to the billing module, the billing module is configured to produce billing files based on the demanded service, the billing data, and the call detail records, and transmit the billing files with invoicing instructions to a clearing module.

\* \* \* \* \*